No. 774,805. PATENTED NOV. 15, 1904.
C. S. WHEELWRIGHT.
PROCESS OF COOKING GARBAGE, &c., AND REMOVING
THE OIL, &c., THEREFROM.
APPLICATION FILED OCT. 31, 1903.
NO MODEL.
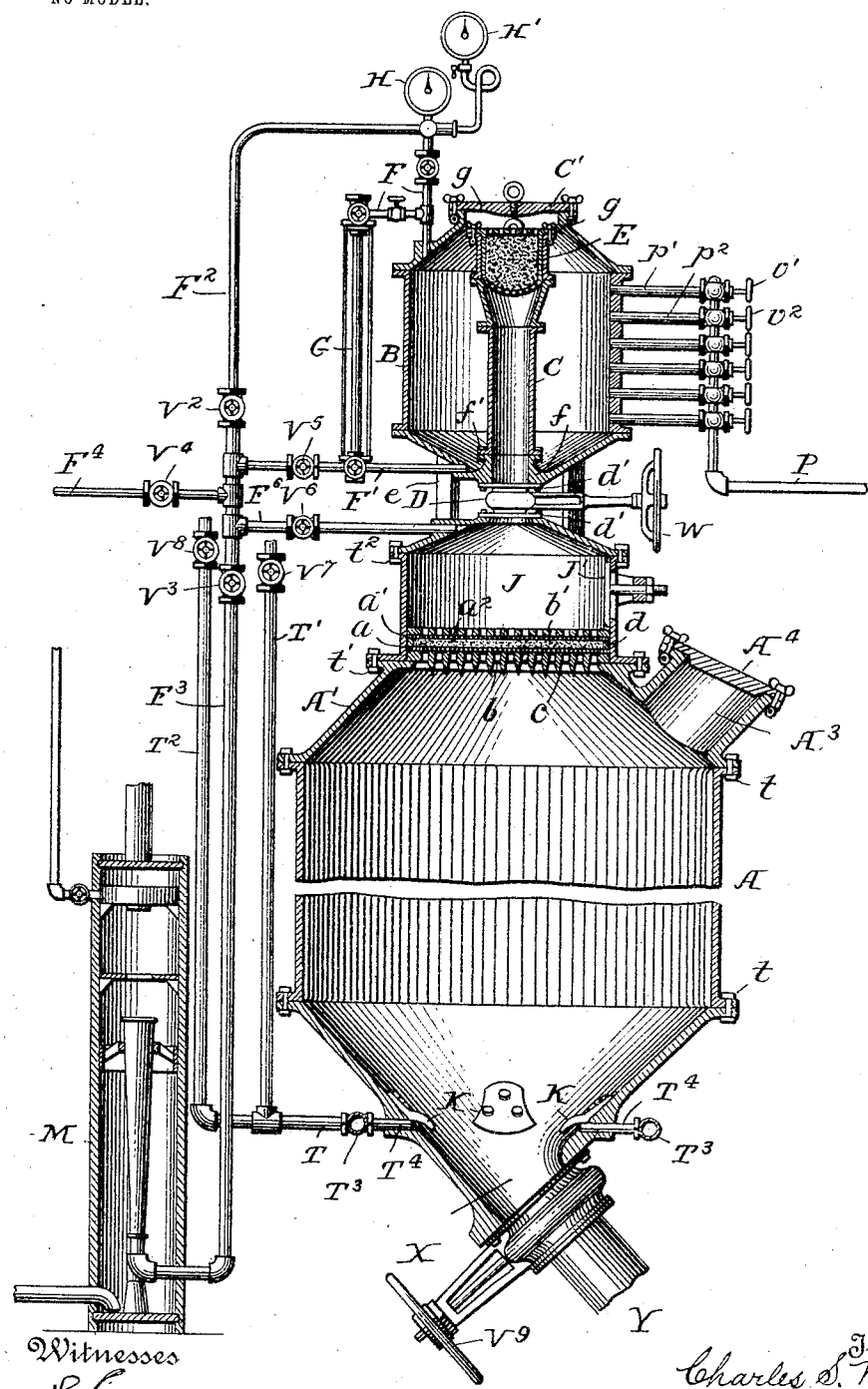
Witnesses
Inventor
Charles S. Wheelwright
by Foster, Freeman & Watson,
Attorneys No. 774,805.

Patented November 15, 1904.

UNITED STATES PATENT OFFICE.

CHARLES S. WHEELWRIGHT, OF BRISTOL, RHODE ISLAND.

PROCESS OF COOKING GARBAGE, &c., AND REMOVING THE OIL, &c., THEREFROM.

SPECIFICATION forming part of Letters Patent No. 774,805, dated November 15, 1904.

Application filed October 31, 1903. Serial No. 179,383. (No specimens.)

*To all whom it may concern:*

Be it known that I, CHARLES S. WHEELWRIGHT, of Bristol, in the State of Rhode Island, have invented a new and useful Improvement in Methods or Processes of Cooking Garbage or Offal and Removing the Oil or Melted Grease Therefrom, of which the following is a specification.

The invention consists in the herein-described process or method of removing the oil or grease from garbage or offal, which consists in introducing under pressure direct steam into the mass of garbage or offal, together with fresh water sufficient, with the water of condensation, to float the oil or grease extracted from said garbage or offal by said steam and fresh water, continuously trapping the oil or melted grease thus extracted and water, at the same time holding back the solid parts of said garbage or offal and finally separating said trapped water from said trapped oil or melted grease.

I proceed to describe apparatus by which said method or process may be put in practice. The process conducted by the apparatus herein described, like the process conducted by the apparatus described and claimed in my Patent No. 709,836, is a water process, the oil or grease of the garbage being taken up by water and conveyed, not after the cooking is substantially finished, into a succession of separating-tanks, as in the said former apparatus, but continually during the cooking into a single separating-tank located above the digester, in which the garbage is cooked and there trapped to prevent the flow of oil and water back into the digester; nor, as in the said former apparatus, is the water accompanying the oil, or any of it, as it passes into the separating tank or tanks returned to the digester while the process of cooking goes on. In fact, the central heater of my former apparatus is in this apparatus omitted, and the garbage is cooked by steam entering the digester at the bottom and permeating the garbage throughout, fresh steam being admitted throughout the entire proces of cooking until the entire contents of the digester consist of the original boiling water, water of condensation, and garbage, less water, grease, and oil which have risen to the said tank above, which now holds the said water, grease, and oil which have entered therein permanently trapped or separated from the contents of the digester, the water and oil gage showing a marked line between the oil and water in the said tank. The present digester has near the top a strainer or filter with large teats extending downward therefrom to prevent the clogging of the strainer by the garbage. There is also provided a valve between the digester and the receiving-tank above by which at the end of the cooking operation the contents of the tank, consisting of oil and water, may be shut off from the digester below. The drawing-off operations by which the digester and the receiver are emptied of their contents are thus rendered independent of one another, a matter at times of great advantage.

In the drawing the apparatus is sufficiently represented by a single figure, the same being for the most part a central vertical section.

A is the digester with conical ends, built in sections, preferably of cast-iron, fastened together by bolts, which pass through externally-projecting flanges, as shown at $t$. The interior walls of the perpendicular sections are coarsely corrugated, as shown. The upper conical section A' is truncated, as shown, and ends in a filter-dome J, bolted to the said section, as shown at $t'$, and having its own top bolted to the circular walls of the dome, as shown at $t^2$. For the purposes of this invention the filter-dome may be regarded as a part of the digester. At the junction of the digester and filter-dome, resting on the walls of the conical section A', is a filtering or clarifying bed or screen, consisting of two perforated plates $a\ a'$, having the space between them filled with charcoal or other clarifying substance $a^2$, the whole contained between two other coarsely-perforated plates $b\ b'$, the plate $b$ being furnished with large teats $c$ to keep the garbage from clogging the filter and resting on the walls of the conical section A', while the plate $b'$ rests on a ring $d$, which also serves to hold the plates $a$ and $a'$ and the charcoal in place. The plates $b\ b'$ are of sufficient strength and thickness not to be warped by the heat to which the digester and dome are subjected. In some instances it will be sufficient to employ the plate $b$ and teats $c$ as a separator without the charcoal filter, the necessary filter being provided in a trap, as hereinafter indicated. The dome J has at one side a large opening, closed by a plate of proper shape, J', which is held in place by a yoke and screw in the ordinary manner. B is a receiving-tank, formed in sections substantially in the same manner as the said digester and provided with a stand-pipe C, also formed in sections, which opening from the top of said digester extends from the bottom of said receiving-tank, within the same, to near the top thereof, as shown. The walls of the tank and of the stand-pipe should be of great strength. Between the digester and the receiving-tank is a valve-shell D, containing a valve, (not shown,) operated by a hand-wheel W, as indicated, by which communication between the digester and the receiving-tank may be shut off or regulated. A lower flange $d'$ of the said valve-shell D is bolted to the digester, while to the upper flange $d'$ of said valve-shell the receiving-tank is bolted. Additional supports $e$ $e$, &c., are furnished between the digester and receiving-tank. The lower part of the stand-pipe C is formed by the walls of the lower conical section of the receiving-tank, as shown at $f$, the remaining portion of the stand-pipe being bolted thereto at $f'$. The upper portion of the stand-pipe C contains a charcoal filter or clarifier E, secured to the top of the filter by hand-screws $g$ $g$, as shown. The top of the receiving-tank B is removable, as shown, the opening closed by the said top being large enough for the removal of the charcoal filter E from the apparatus to be cleaned or recharged with charcoal. The receiving-tank B is furnished with an oil and water gage G, as shown, connected to the said tank by pipes F and F', as shown, and with a set of pipes $p'$ $p^2$, &c., connecting with pipe P, by which oil may be drawn off from the tank B at various heights through valves $v'$ $v^2$, &c., for storage. There are also a thermometer H and a pressure-gage H', connected to the tank by the said pipe F. Connected with pipe F also is an outlet-pipe $F^2$ for escaping gas, having a valve $V^2$, which connects with a pipe $F^3$, valved at $V^3$, connecting with a condenser M, as shown. Connecting with pipe $F^3$ is a fresh-water pipe $F^4$, valved at $V^4$. A continuation of the pipe F', valved at $V^5$, connects with pipe $F^3$ between the valves $V^2$ and $V^3$, and between the same valves a pipe $F^6$, valved at $V^6$, leading from the top of the digester or from the top of the filter-dome J, connects with pipe $F^3$.

T is a pipe communicating with pipe T', (valved at $V^7$,) leading to the boiler, and with pipe $T^2$, (valved at $V^8$,) leading to the fresh-water supply and ending in a circular pipe $T^3$, which surrounds the lower conical section of the digester, as shown, the said circular pipe $T^3$ being provided with a number of pipes $T^4$ $T^4$, &c., (but two are shown, although any number may be used,) passing through the wall of said conical section to the interior of the digester, where above the opening provided for each pipe $T^4$ is a deflector K, bolted to the interior wall of the digester, as shown, to direct the steam or water entering through the said pipes $T^4$ downward along the interior wall of the digester.

The digester is provided with a large opening at $A^3$, with a movable cover $A^4$, which may be bolted, as shown, and a large exit at X, flush with the conical side walls of the digester, closed by a gate-valve $V^9$ in a pipe Y.

The operation is as follows: Valve $V^8$ is opened and a supply of water admitted to the digester sufficient to cushion the load of garbage, which is dumped into the digester immediately upon the closing of the said valve $V^8$. The cover $A^4$ is put on and fastened, and steam is admitted to the digester by opening valve $V^7$, when the cooking commences and continues for seven or eight hours. The garbage contains about eighty per cent. of water, and this water, together with the cushion-water, increasing in volume by expansion under increase of temperature and by the addition of water from the condensation of the steam carries upward, floating upon the surface, melted grease and oil extracted from the garbage through the filter and dome J into and through the stand-pipe C and the filter at the top of the stand-pipe, where water and oil flow over the receiving-tank B, the water falling to the bottom and the oil keeping on the top of the water. If the water of condensation supplied by the steam admitted through valve V is not sufficient to keep up the necessary amount of water for increase of volume, as aforesaid, more water may be admitted from time to time by opening valve $V^8$. At proper times water may be drawn off through pipe F' from the bottom of the receiving-tank and saved by opening valves $V^5$ and $V^3$. So, too, as often as may be necessary water and steam may be blown off from the top of the digester or the filter-dome J through pipes $F^6$ and $F^3$ by opening valves $V^6$ and $V^3$. At the conclusion of the cooking the valve V in shell D may be closed, and the contents of the digester and receiving-tank separately dealt with. The rest of the operation is obvious.

Conforming to the present rules of the Patent Office requiring division between apparatus and method or process claims, I in this application make no claim to apparatus, the same being fully claimed in a companion application filed herewith October 31, 1903, Serial No. 179,382.

What I do claim as new and useful, and desire to secure by Letters Patent of the United States, is—

The herein-described process or method of removing the oil or grease from garbage or offal, which consists in continuously introducing under pressure direct steam into the mass of garbage or offal together with fresh water sufficient, with the water of condensation, to float the oil or grease extracted from said garbage or offal by said steam and fresh water, continuously trapping the oil or melted grease thus extracted and water, at the same time holding back the solid parts of said garbage or offal, and finally separating said trapped water from said trapped oil or melted grease, substantially as described.

CHARLES S. WHEELWRIGHT.

Witnesses:
WILLIAM W. SWAN,
IDA E. HANDREN.